US006953509B2

(12) United States Patent
Keener

(10) Patent No.: US 6,953,509 B2
(45) Date of Patent: Oct. 11, 2005

(54) METHOD FOR PREPARING PRE-COATED, METALLIC COMPONENTS AND COMPONENTS PREPARED THEREBY

(75) Inventor: Stephen G. Keener, Trabuco Canyon, CA (US)

(73) Assignee: The Boeing Company, Chicago, IL (US)

(*) Notice: Subject to any disclaimer, the term of this patent is extended or adjusted under 35 U.S.C. 154(b) by 99 days.

(21) Appl. No.: 10/453,379

(22) Filed: Jun. 3, 2003

(65) Prior Publication Data

US 2004/0247835 A1 Dec. 9, 2004

(51) Int. Cl.[7] .................................................. C22F 1/10
(52) U.S. Cl. ...................................... 148/537; 148/675
(58) Field of Search ......................................... 148/537

(56) References Cited

U.S. PATENT DOCUMENTS

| 3,791,850 A | * | 2/1974 | Deshay et al. ............... 428/328 |
| 3,979,351 A | | 9/1976 | Sekhon |
| 4,156,040 A | * | 5/1979 | Swider et al. ............... 148/527 |
| 5,614,037 A | | 3/1997 | Keener |
| 5,858,133 A | | 1/1999 | Keener |
| 5,922,472 A | | 7/1999 | Keener |
| 5,944,918 A | | 8/1999 | Keener |
| 6,221,177 B1 | | 4/2001 | Keener |
| 6,274,200 B1 | | 8/2001 | Keener et al. |
| 6,403,230 B1 | | 6/2002 | Keener |
| 6,475,610 B1 | | 11/2002 | Keener et al. |
| 6,494,972 B1 | | 12/2002 | Keener et al. |
| 6,610,422 B1 | * | 8/2003 | Ooi et al. .................... 428/653 |
| 2004/0163740 A1 | * | 8/2004 | Keener et al. ............... 148/537 |

FOREIGN PATENT DOCUMENTS

| DE | 2743381 B | * | 8/1978 |
| FR | 2 851 580 | | 8/2004 |

OTHER PUBLICATIONS

Copy of Search Report for corresponding French Appl. No. 0406017 dated Mar. 8, 2005.

* cited by examiner

Primary Examiner—George Wyszomierski
(74) Attorney, Agent, or Firm—Alston & Bird LLP

(57) ABSTRACT

A high-strength, corrosion- and heat-resistant aircraft structural component such as a fastener is prepared by providing a corrosion-resistant stainless steel or heat-resistant superalloy metallic component precursor that is not in its final heat-treated state, and coating with an aluminum-containing, curable polyaromatic phenolic coating material having a non-volatile portion that is predominantly organic and is curable at about the high-strength metallic alloy component's stress equalizing tempering temperature. The coated, high-strength metallic-alloy component is then thermally treated to concurrently impart pre-determined metallurgical properties to the finished, metallic substrate, and cure the organic, aluminum-containing coating.

15 Claims, 3 Drawing Sheets

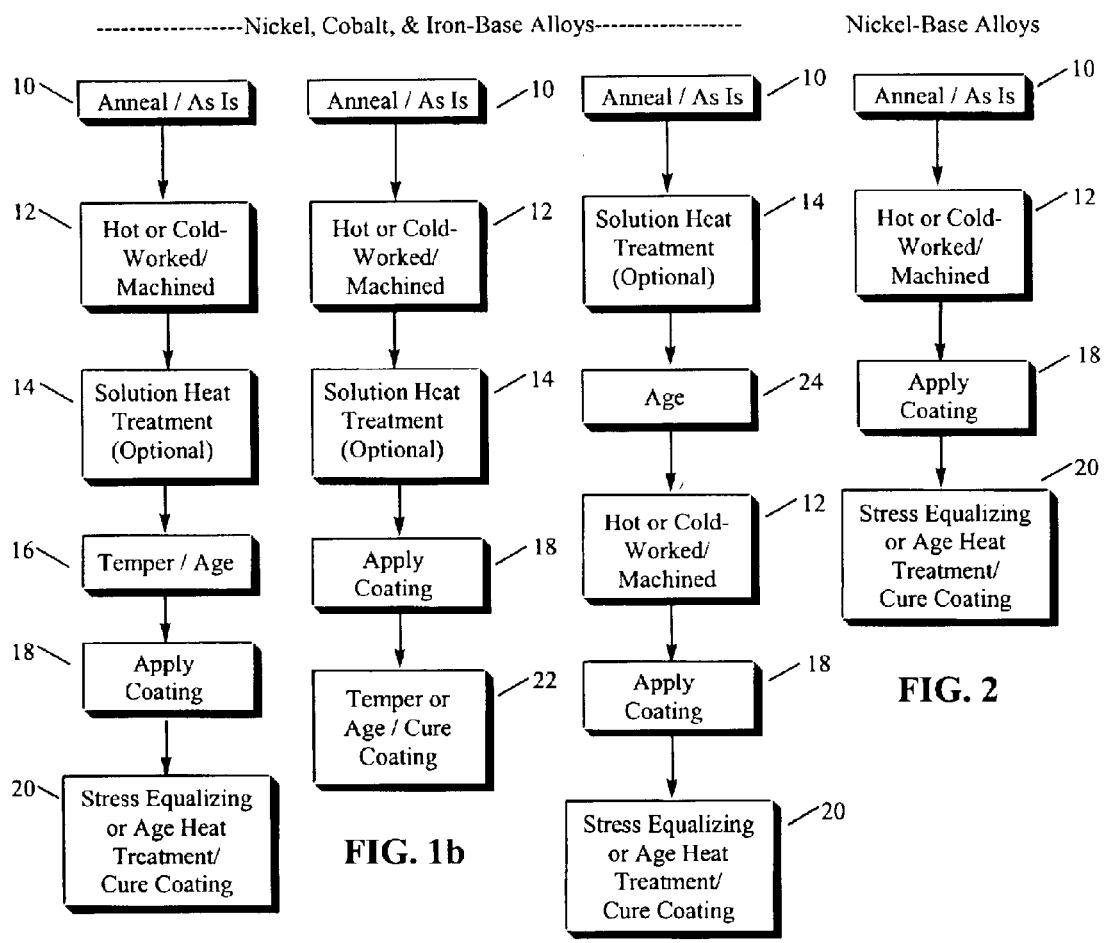

Corrosion-Resistant Alloys

METHOD FOR PREPARING PRE-COATED, METALLIC COMPONENTS AND COMPONENTS PREPARED THEREBY

BACKGROUND OF THE INVENTION

This invention relates to the preparation of pre-coated, high-strength stainless steel and superalloy metallic components. More particularly, the present invention relates to the use of organic, corrosion-inhibiting coatings containing aluminum pigment to coal high-strength metallic corrosion-resistant stainless steel and heat-resistant superalloy materials used as aircraft structural components.

Aircraft manufacturers use a variety of different ferrous and non-ferrous metals in the fabrication of aircraft components. Commonly assigned U.S. Pat. Nos. 5,614,037; 5,858,133; 5,922,472; 5,944,918; 6,221,177, and 6,403,230 disclose methods for pre-treating aluminum-alloy articles to obviate the use of wet-sealants and other coatings for protection against corrosion damage. Pre-coated ferrous-alloy articles such as carbon steels and aircraft-quality low-alloy steels, for example; Aermet 100, Hy-Tuf™, 300M, H-11, HP9-4-30, 52100, 1095, 4130, 4135, 4140, 4330V, 4340, 6150, 8740, etc. are often used as structural aircraft components and are disclosed in U.S. Pat. Nos. 6,274,200 and 6,475,610. It had been known to protect ferrous-alloy components, which include fasteners, bearings, struts, etc. from wear and corrosion by applying an overplate of cadmium alone or in combination with a chrome plate. Previously, these fasteners were often installed using wet-sealant. While this use of wet-sealant and/or plated overcoat protected the various material substrates from corrosion, such wet-sealant installation and cadmium and chrome-plating processes are time consuming, cumbersome, expensive, and environmentally undesirable.

It would be extremely desirable to impart corrosion resistance to the high-strength stainless steel and superalloy metallic substrates obviating the need for the chrome and cadmium-plating and/or wet-sealant installation processes. It would be further highly desirable to incorporate the coating cure step into an existing alloy fabricating process.

SUMMARY OF THE INVENTION

One embodiment of the present invention relates to a method for providing a corrosion-resistant coating and applying it to high-strength, nickel-base corrosion-resistant alloy and heat-resistant superalloy aircraft structural components. With regard to the nickel-base alloys, an aircraft structural component made from a nickel-base corrosion-resistant or heat-resistant superalloy precursor preferably is provided in an annealed, untreated state. The nickel-base superalloy precursor is then coated with an aluminum-containing, curable organic coating having a non-volatile portion that is predominantly organic. The coating is curable at a temperature approximately equal to the superalloy component's stress equalizing heat-treatment tempering temperature, and is applied to the superalloy precursor prior to the final stress equalizing process step. In one embodiment, the coating material is flash cured (200° F. for about 1–2 minutes to facilitate handling immediately following its application). The coated, nickel-base superalloy precursor is then subjected to a stress equalizing heat treatment to substantially concurrently 1) impart pre-determined metallurgical properties or characteristics to the finished nickel-base superalloy component, and 2) cure and fully cross-link the organic, aluminum-containing coating.

The term "stress equalizing heat treatment" refers to a low-temperature heat-treatment procedure used to balance stresses in cold-worked material without an appreciable decrease in the mechanical strength produced by cold-working.

More specifically, the present invention is directed to a method for pre-treating a high-strength, corrosion-resistant stainless steel alloy aircraft structural component comprising the steps of providing an aircraft structural component made from a high-strength, alloy precursor selected from the group consisting of 302, 303, 304, 305, 410, 416, 430, 440C, Custom 450, Custom 455, 17-7PH, and 17-4PH stainless steels, the stainless steels, each having a pre-determined heat-treatment temperature, and subjecting the component to a hardening treatment. A curable organic coating material is provided comprising an organic, phenolic resin mixed with at least one plasticizer and an inorganic additive selected from the group consisting of aluminum powder and chromate-containing filler, preferably strontium chromate. The coating has a non-volatile portion that is curable at about the pre-determined stainless steel alloy heat-treatment temperature. The coating material is applied to the component and the coated component is cured in a stress equalizing heat-treatment step to substantially concurrently heat-treat the alloy to impart desired characteristics and cure the applied coating.

The present invention is further directed to a method for pre-treating a high-strength, nickel-base alloy corrosion- or heat-resistant aircraft structural component by providing an aircraft structural component made from a high-strength, nickel-base alloy, or "superalloy" precursor, the nickel-base alloys having a pre-determined heat-treatment temperature. The preferred corrosion-resistant alloys include nickel-base alloys Monel 400, Monel K-500, Inconel 600, Inconel X-750 and A-286. The component is then subjected to a cold or hot working treatment. A curable organic coating material is provided comprising an organic, phenolic resin mixed with at least one plasticizer and an inorganic additive selected from the group consisting of aluminum powder and a chromate-containing filler, preferably strontium chromate, the coating material having a non-volatile portion that is curable at about the pre-determined nickel-base alloy heat-treatment temperature. The coating material is applied to the component, and the coated component is cured in a stress equalizing heat-treatment step to substantially concurrently heat-treat the alloy and cure the coating.

In addition, the present invention is directed to a stress equalized high-strength, corrosion-resistant aircraft structural stainless steel alloy component comprising a coating made from an organic, phenolic resin mixed with at least one plasticizer and an inorganic additive selected from the group consisting of aluminum powder and strontium chromate. Preferably the stainless steel alloy is selected from the group consisting of 302, 303, 304, 305, 410, 416, 430, 440C, Custom 450, Custom 455, 17-7PH, and 17-4PH stainless steels.

Still further, the present invention is directed to a method for assembling an aircraft component with a corrosion-resistant coated fastener comprising providing a high-strength, aircraft structural component made from an alloy precursor having a pre-determined heat-treatment temperature and stress equalizing tempering the precursor. An organic coating material is provided comprising a phenolic resin mixed with at least one plasticizer, and an inorganic additive selected from the group consisting of aluminum powder and strontium chromate, the coating material having a non-volatile portion that is organic and is curable at a temperature about equal to the pre-determined heat-treatment temperature. The precursor is then coated with the organic coating followed by stress equalizing tempering the coated alloy precursor to a finished alloy material by tempering to a temperature of from about 450° F. to about a600° F. for a duration of from about 1 hour to about 1½ hours to substantially concurrently temper the finished alloy material and cure the coating.

In addition, the present invention is also directed to a method for assembling an aircraft component with a corrosion-inhibiting coated fastener comprising providing a high-strength, aircraft structural component made from an alloy precursor having a pre-determined stress equalizing heat-treatment temperature followed by austenitizing the precursor. An organic coating is provided comprising a polyaromatic phenolic resin mixed with at least one plasticizer, polytetrafluoroethylene and an inorganic additive selected from the group consisting of aluminum powder and strontium chromate. The coating material has a non-volatile portion that is organic and is curable at a temperature about equal to the pre- determined stress equalizing heat-treatment temperature. The precursor is then coated with the organic coating, followed by stress equalizing tempering the coated, alloy precursor to a temperature of from about 450° F. to about 600° F. for a duration of from about 1 hour to about 1½ hours to substantially concurrently stress equalizing temper the finished alloy material and cure the coating. According to one process of the present invention, the coated, superalloy component is formed, cold-worked or thread rolled into a completed or partially completed form prior to the coating being applied.

In a still further embodiment, the present invention relates to a further method for coating a high-strength, superalloy aircraft structural component with a corrosion-inhibiting coating. A high-strength aircraft structural component made from a superalloy precursor is provided and austenized/normalized, followed by quenching. The component is cold-worked or otherwise formed such as, by thread rolling, and then coated with an aluminum-containing, curable organic coating material having a non-volatile portion that is predominantly organic and is curable at about the superalloy material's stress equalizing heat-treatment tempering temperature. The superalloy precursor is then subjected to the tempering temperature of from about 450° F. to about 600° F. for a duration of from about 1 hour to about 3 hours. The appropriate ranges depend on the specific nickel-base superalloy being treated. Most preferably for the components of the present invention, the tempering temperature is about 525° F. for about 1 hour to about 1½ hours. This stress equalizing heat-treatment tempering operation concurrently 1) imparts the desired metallurgical characteristics to the nickel-base superalloy material and 2) properly cures the coating.

These embodiments yield surprising and unexpected technical and cost advantages when used in conjunction with high-strength, stainless steel and nickel-base corrosion- and heat-resistant superalloy aircraft structural components such as bearings, hinges, fittings, gears, struts, fasteners, rivets, etc. Through the use of the coating techniques of the present invention, the need to plate the components with cadmium or chrome and/or use wet-sealant in their installation for corrosion protection is obviated. Other features and advantages of the present invention will be apparent from the following more detailed description of the preferred embodiments, taken in conjunction with the accompanying drawings, which illustrate, by way of example, the principles of the invention.

BRIEF DESCRIPTION OF THE DRAWINGS

FIGS. 1a–1c are process flow diagrams for the methods of the invention for nickel, cobalt and iron-base heat-resistant superalloys.

FIG. 2 is a process flow diagram for the method of the invention for nickel-base corrosion- and heat-resistant superalloys.

DETAILED DESCRIPTION OF THE INVENTION

Figure 3A:
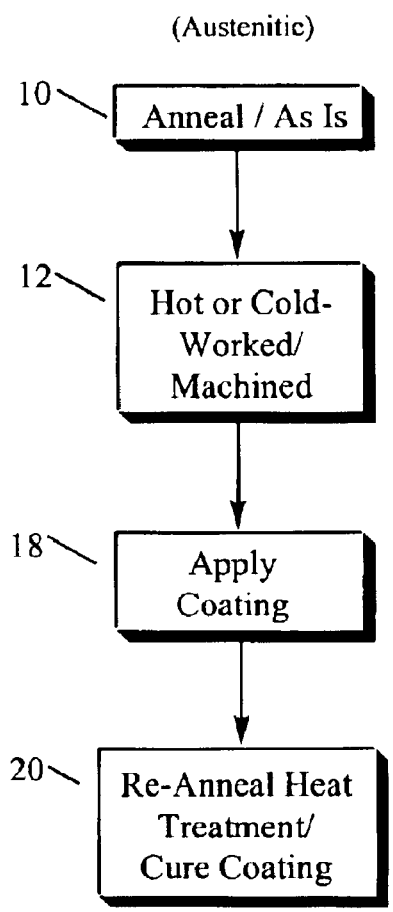
FIGS. 3a–3b are process flow diagrams for the method of the invention for austenitic and ferritic/martenistic (respectively) corrosion-resistant stainless steel and nickel-base alloys.

FIGS. 1a–1c, 2, and 3a–3b. are schematic flow diagrams outlining the method of the present invention when applied to various corrosion- and heat-resistant high-strength, metallic alloys. According to one preferred method of the present invention shown in process 1a, a heat-resistant alloy work piece is supplied and annealed 10. The partially-treated fastener is then hot-worked, cold-worked, formed, or machined 12. The work piece is then solution heat treated 14, followed by a tempering/aging step 16. A coating material is provided and applied 18 to the work piece to a specified, carefully controlled and pre-determined coating thickness by any of various contemplated methods. Finally, the coated work piece is exposed to a curing/stress equalizing heat-treatment step 20 followed by installation (not shown).

FIG. 1b sets forth a step-wise process contemplated by a further embodiment of the present invention that removes the tempering/aging step 16 as was done in process shown in FIG. 1a, and instead employs a combined tempering/aging and cure coating final processing step 22.

FIG. 1c shows a further preferred process of the present invention whereby a heat-resistant alloy is annealed or taken as is 10, followed by a solution heat treatment step 14 for approximately 2 hours to 4 hours. The work piece is then aged in an aging step 24 for a total period of time, preferably from about 24 hours to about 48 hours depending upon the material alloy. The work piece is then hot-worked, cold-worked, formed, or machined 12. The coating is then applied 18 followed by the final curing/stress equalizing heat-treatment step 20.

The addition of magnesium, aluminum, silicon, titanium, and certain other alloying elements to nickel and nickel-base alloys, separately or in combinations, produces an appreciable response to age hardening. The effect is dependant upon both chemical composition and aging temperature; it is caused by precipitation of submicroscopic particle throughout the grain, which results in a marked increased in hardness and strength.

Unlike precipitation hardening stainless steels and aluminum-based alloys, the nickel and nickel-base alloys normally do not require solution heat-treating in the upper annealing temperature range prior to age hardening. However, solution treating may be employed to enhance special properties. For example, Inconel X-750 may be solution heat-treated for about 2 to 4 hours at approximately 1150° C. (2100° F.) and air-cooled prior to a double or two-step, i.e. high and low temperature, aging cycle to develop maximum creep, relaxation, and rupture strength at temperatures above approximately 600° C. (1100° F.). Specifically, this two-step aging process entails exposure to about 845° C. (1550° F.) for 24 hours; air cooled; then re-heated to about 705° C. (1300° F.) for approximately 20 hours, followed by an air-cooling step. This combination of heat treatments is considered essential for high-temperature components, fasteners, springs, turbine blades, etc. made of Inconel X-750 and other heat-resistant superalloys.

Aging treatments strengthen age-hardenable alloys by causing the precipitation of one or more phases from the supersaturated matrix that is developed by solution heat-treating and retained by rapid cooling from the solution treating temperature. Factors that influence the selection of number of aging steps and aging temperatures include: (a) type and number of precipitating phases available, (b) anticipated service temperature, (c) precipitate size, and (d) the combination of strength and ductility desired and heat treatment of similar alloys.

When more than one phase is capable of precipitating from the alloy matrix, judicious selection of a single aging temperature may result in obtaining optimum amounts of multiple precipitating phases. Alternatively, a double or two-step aging treatment that produces different sizes and types of precipitate at different temperatures may be employed. The aging temperature also determines not only the type but also the size distribution of precipitate. Certain types of nickel-base alloys use this double aging treatment, which represent this co-precipitation heat treatment approach.

Exposure to temperatures higher than the optimum aging temperature results in a decrease in strength through the process of overaging. At still higher temperatures, re-solution may occur. High aging temperatures will produce coarser gamma prime particles than lower temperatures and result in higher creep-rupture properties. For optimum product, short time elevated-temperature properties, small, finely-dispersed particles of gamma prime precipitate are desired. Therefore, lower final aging temperatures than those used to obtain high creep-rupture properties preferably are employed. A principal reason for two-step aging treatments, in addition to gamma prime or gamma double prime control, is the need to precipitate or control grain boundary carbide morphology.

A uniformly fine-grain microstructure can be produced in the age-hardenable, heat-resistant alloys if final deformation is carried out in the lower part of the hot-working range. This type of metallurgical structure can be solution treated to a uniform grain size. Alloys deformed in the upper hot-working range have a coarser structure that cannot be refined by solution treating.

Cold-working is usually performed on alloys in the solution-treated condition because of the markedly lower strength and increased ductility of the material before aging. Cold-working itself affects mechanical properties, through its influence on: (a) grain growth during subsequent solution treatment, and (b) the reaction kinetics of aging.

The age-hardenable, heat-resisting alloys are susceptible to critical grain growth if they are solution treated after small amounts of cold or hot work. Larger amounts of cold work refine the grain size. Excessive grain growth may have deleterious effects on creep and fatigue properties in all heat-resisting alloys. Therefore, on parts subjected to cold or hot work prior to solution treating, the critical amount of work (about 1% to about 6% cold work, depending on the alloy, or about 10% hot work) must be exceeded in all areas, to avoid the growth of abnormally large grains. This rule applies to items such as cold-headed or hot-worked bolts, fasteners, or other formed components.

FIG. 2 shows one process of the present invention where a nickel-base corrosion-resistant alloy or heat-resistant superalloy work piece is annealed or taken in the as-is condition 10 followed by a hot-worked, cold-worked, formed, or machined stage 12. The piece is then coated 18 followed by the final curing/stress equalizing heat-treatment step 20.

The curing step takes place at specific and pre-determined conditions of time, pressure and temperature for the specific alloy being processed, such that the coating is cured concurrently with the stress equalizing heat-treating of the nickel-alloy article.

In one embodiment, the present invention contemplates using the high-strength, corrosion-resistant stainless steel and heat-resistant iron-, cobalt-, and nickel-base superalloy materials compatible with the selected aluminum-containing, organic corrosion-inhibiting coating formulation requiring a subsequent aging/curing period. The preferred corrosion-resistant, nickel-base materials include Monel 400, Monel K-500, and Inconel 600. The preferred corrosion-resistant stainless steel materials include 302, 303, 304, 305, 410, 416, 430, Custom 450, 17-4PH, and 17-4PH. The preferred heat-resistant nickel-base superalloy materials include Inconel 600, 625, 718, X-750, and A286. The subsequent aging/curing period can be conducted at an elevated temperature to facilitate curing. In one embodiment, once cured, it is preferred that the coating be tack-free to enable handling. The coating thickness achievable by the present invention may vary according to the preferred end-result characteristics of the coated component, but preferably the coating thickness ranges from about 0.0003 inch to about 0.0005 inch.

One embodiment of the invention relates to the preparation of fasteners such as rivets and threaded bolts although the invention is not limited to fasteners, and instead is more broadly applicable. However, the use of the present invention relative to fasteners offers particular advantages. The fasteners contemplated by the present invention include, but are not limited to, screws, bolts, lockbolts, threaded pins, rivets, etc., which may have threads, or grooves, as well as female mating components such as nuts, lock washers, collars, etc.

Fasteners are understood to mechanically join the various structural elements and sub-assemblies of aircraft. With regard to aircraft fasteners, the elimination of the practice of wet-sealant installation approach for more than one million fasteners in a large cargo aircraft offers a significant cost savings of several hundreds of thousands of dollars per aircraft. As contemplated by the present invention, the elimination of the use of wet-sealants also improves the overall quality and workmanship in the fastener installation, such as eliminating the possibility of missing or overlooking some of the fasteners as the wet-sealant is applied along with reducing the process variability associated with the fastener installation. Further, the pre-coated fasteners provide superior protection from corrosion during service than the uncoated, wet-installed fasteners.

Known wet-sealants include, two-part, manganese-cured, polysulfide sealants containing an additional quantity of soluble metallic chromates. These are flowable viscous materials, which are applied by brush, spatula, roller, special applicator, or extrusion gun. Examples are P/S 1422 or 870C corrosion-inhibiting sealants produced by PRC-Desoto (a.k.a. PPG Aerospace, a division of Pittsburgh Paint and Glass). By contrast, the process of the present invention pre-coats the components with a pre-selected organic coating and obviates the need for the use of wet-sealant during the installation and assembly process.

The application of the organic coating obviates the need for cadmium or chrome-plating and/or use of wet-sealant during installation and does not adversely affect the desired final properties or performance of the component. Indeed, it has now been determined, through actual testing, that the corrosion-resistant properties of the coated components are enhanced as compared to the properties of plated and/or wet-sealant installed corrosion-resistant, stainless steel alloy and heat-resistant superalloy materials.

The preferred bolts are manufactured from any one of a number of high-strength, corrosion-resistant, stainless steel alloy and heat-resistant superalloy metallic materials. As used herein, "corrosion-resistant" means that the metallic material is an austenitic, martensitic, or ferritic stainless steel, or nickel-base alloy. On the other hand, "heat-resistant" means that the metallic material is an iron-, cobalt-, or nickel-base alloy that can be strengthened by one of the following mechanisms: solid-solution strengthening, precipitation hardening, and oxide-dispersion strengthening, processing readily understood by those skilled in the metallurgy field.

One embodiment of the present invention is directed to aircraft components or fasteners made from either corrosion-resistant alloy or heat-resistant superalloy metallic materials. Specifically, these components are made of stainless steels and non-ferrous alloy materials, preferably stainless steels and nickel-, cobalt-, or iron-based alloys. Aerospace components, such as fasteners, have been made from unusual materials, e.g., tantalum, but this invention is primarily directed to the use of corrosion- and heat-resistant materials used in commercial and aerospace fasteners that are readily available as standard components such as those listed in Tables 1 and 2 below, or their analogues.

A majority of all industrial fasteners classified as 'corrosion-resistant' are made of stainless steels. This general designation covers austenitic, martensitic, and ferritic stainless steels. Although the aerospace industry uses fasteners made from all types of stainless steels, the 300 series austenitic types are most widely used in the fabrication of components or fasteners. The alloys in this austenitic group have at least 8% nickel in addition to chromium. They offer a greater degree of corrosion resistance than the martensitic and ferritic types, but less resistance to chloride stress-corrosion cracking. Martensitic and ferritic stainless steels contain at least 12% chromium, but contain little or no nickel because it stabilizes austenite. Martensitic grades, such as Types 410 and 416, are magnetic and can be hardened by heat treatment. Ferritic alloys, such as Type 430, are also magnetic but generally cannot be hardened by heat treatment, but rather develop maximum ductility, toughness, and corrosion resistance in the annealed and quenched condition. Therefore, the only heat treatment applied to the ferritic alloys is annealing.

The fastener industry generally markets fasteners made of Types 302, 303, 304, and 305 stainless steels as "18-8". Ferritic and martensitic stainless steels for fastener use have included alloy Types 410, 416, and 430. Corrosion-resistant, nickel-base alloys characterized by good strength and good resistance to heat and corrosion and that are used as fastener materials include Monel 400, Monel K-500, and Inconel 600. According to the present invention, the pre-coating processes of the present invention enhance the inherent level of corrosion protection for each substrate listed in Tables 1 and 2 according to the steps outlined in FIGS. 1a–1c, 3a, and 3b for corrosion- and heat-resistant alloys.

Figure 3B:
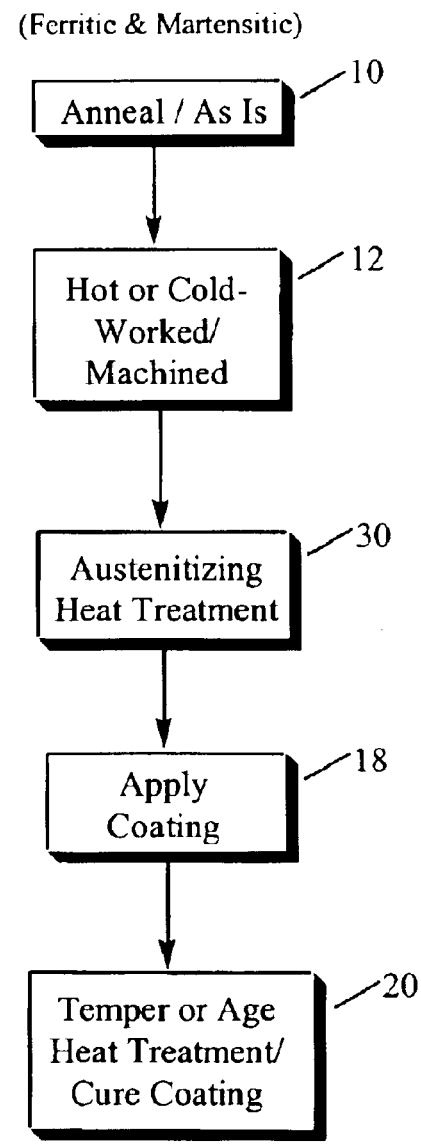

Similarly, corrosion-resistant stainless steel alloys presented in Table 1 conform to the process steps outlined in FIGS. 3a and 3b. FIG. 3a shows a scheme for an austenitic corrosion-resistant alloy. The alloy is supplied and annealed 10, then hot-worked, cold-worked, formed or machined 12. A pre-selected material is provided and applied 18 to the alloy to a specified, carefully controlled and pre-determined coating thickness by any of the various contemplated methods. Finally, the coated alloy is exposed to a curing/stress equalizing heat treatment step 20. In FIG. 3b for ferritic and martensitic alloys, an austenitizing heat treatment 30 is conducted after the working or machining step 12 and the coating application 18.

TABLE 1

Corrosion-Resistant Alloy Types

| Commercial Designation | UNS No. | ASTM Specification |
|---|---|---|
| Stainless steels | | |
| Austenitic | | |
| Type 302 | S30200 | F593 & F594 |
| Type 303 | S30300 | " |
| Type 304 | S30400 | " |
| Type 305 | S30500 | " |
| Ferritic & Martensitic | | |
| Type 410 | S41000 | F593 & F594 |
| Type 416 | S41600 | " |
| Type 430 | S43000 | " |
| Type 440C | S44000 | " |
| Austenitic-Martensitic (Precipitation-Hardening) | | |
| 17-4PH | S17400 | F593 & F594 |
| 17-7PH | S17700 | |
| PH15-7Mo | S15700 | |
| Custom 450 | — | |
| Custom 455 | — | |
| Nickel-base alloys | | |
| Monel 400 | N04400 | F468 & F467 |
| Monel R-405 | N04405 | " |
| Monel K-500 | N05500 | " |
| Inconel 600 | N06600 | " |

TABLE 2

Heat-Resistant Superalloy Types

| Commercial Designation | UNS No. | ASTM Specification |
|---|---|---|
| Nickel-base alloys | | |
| Inconel 600 | N06600 | F468 & F467 |
| Inconel 625 | N06625 | — |
| Inconel 718 | N07718 | — |
| Inconel X-750 | N07750 | — |
| Hastelloy X | N06002 | — |
| Rene 41 | N07041 | — |
| Waspaloy | N07001 | — |
| Cobalt-base alloys | | |
| MP-35N | R30035 | — |

TABLE 2-continued

Heat-Resistant Superalloy Types

| Commercial Designation | UNS No. | ASTM Specification |
| --- | --- | --- |
| MP-159 | — | — |
| Haynes 25 | R30605 | — |
| Haynes 188 | R30188 | — |
| Iron-base alloys | | |
| A-286 | K66286 | — |
| Haynes 556 | — | — |

The previous discussion dealt with those corrosion-resistant stainless-steel alloys that are most often used for commercial and aerospace fasteners whose compositions are recognized as standard by the American National Standards Institute (ANSI) organization. There are numerous other corrosion-resistant stainless steel materials contemplated for use with the processes of the present invention that are also used, either for standard fasteners or for special components or parts, when dictated by strength considerations, corrosion protection performance, or temperature requirements, including, for example, 17-4PH, 17-7PH, Custom 450, and Custom 455. These materials are used to obtain higher strength properties than those available from "18-8" stainless steel materials.

Additionally, A-286, an iron-base heat-resistant superalloy that has greater corrosion resistance than the 18-8 types, as well as good mechanical properties at elevated temperatures, is intended for use with the processes of the present invention, for applications requiring resistance to both heat and corrosive media environments.

More specifically, the A-286 and Monel 400 materials have provided the focus of significant cost savings on cargo aircraft applications. The processes of the present invention are also contemplated for use for components in areas such as cargo floors, door areas, engine nacelles, fuel tanks, or areas containing hydraulic fluids. Other particular alloys have also been utilized in the pre-coating process of the present invention resulting in successful improvements in their corrosion resistance.

The high-strength, corrosion-resistant stainless steel alloy and heat-resistant superalloy metallic components of the present invention achieve their full, required strength and other metallurgical properties produced by the stress equalizing or aging heat-treatment as well as curing of the coating. Predictably, achieving a specified strength level of the substrate is important, because users of the components, such as the customers of aircraft, can not permit or allow a sacrifice of mechanical performance in order to achieve improved corrosion protection. High-strength fasteners are understood to be those fasteners which possess an ultimate tensile strength value of greater than 150,000 psi.

Figure 4:
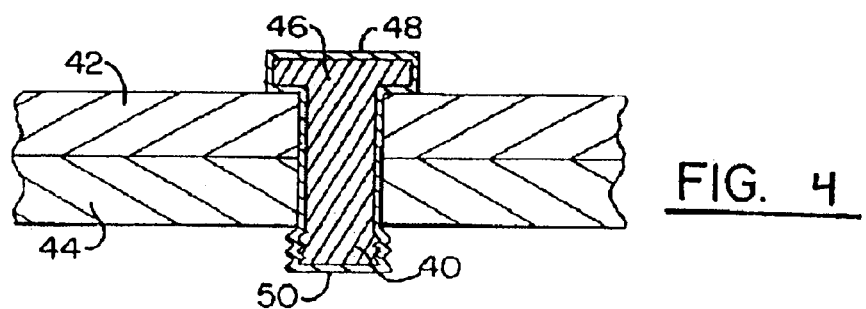
FIG. 4 is a schematic cross-sectional view of protruding-head fastener used to join two pieces, without a female component.
Figure 5:
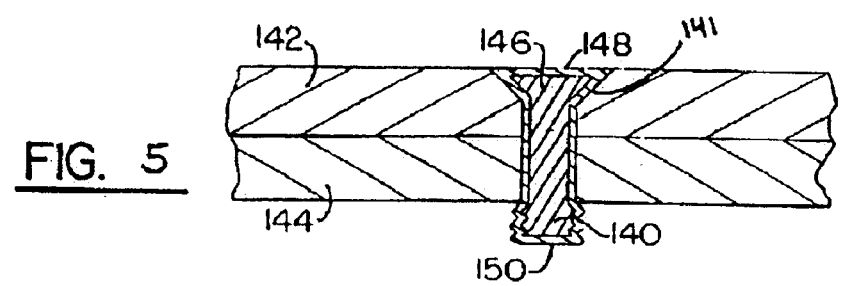
FIG. 5 is a schematic cross-sectional view of a flush-head fastener used to join two pieces, without a female component.
Figure 6:
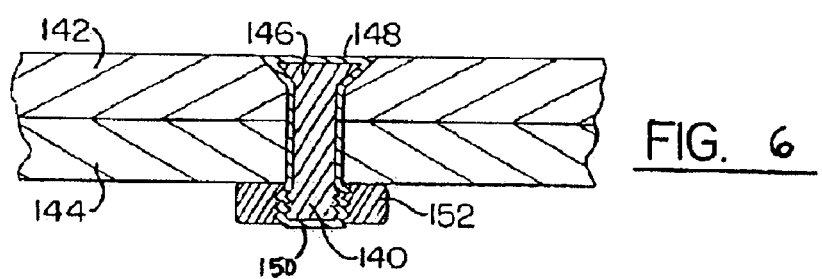
FIG. 6 is a schematic view of the flush-head fastener of FIG. 5, with a female component.

The present invention preferably is used with a rivet, bolt, fastener, or other article or component manufactured to any conventional shape and size. FIGS. 4–6 illustrate two preferred embodiments with two types of bolts 40, 140, at an intermediate state of their installation to join a first piece 42, 142 to a second piece 44, 144, after installation to the first and second pieces but before use of the female component, collar, or nut 152. The bolt 40 of FIG. 4 has a manufactured protruding head 46 on one end and a threaded portion 50, at the opposite end. The bolt 140 of FIG. 5 has a manufactured flush head 146 on one end that resides in a countersink 141 in the piece 142. The present invention may be used with these and other types of fasteners. FIG. 6 shows a female component, collar, or nut 152 engaged with the grooved or threaded portion 150 of bolt 140.

Typically, the high-strength heat-resistant superalloy materials have at least about 50 percent by weight of either iron, cobalt, or nickel with the balance being alloying elements and a minor amount of impurities. Alloying elements are added in precisely controlled amounts to modify the properties of the superalloy materials as desired. Alloying elements that are added to either the iron-, cobalt-, or nickel-base metal to modify its properties include, for example, carbon, manganese, silicon, nickel, chromium, and molybdenum.

The present invention contemplates the use of heat-treatable nickel-base superalloy materials. Preferably, the article is first fabricated to a desired shape through such steps as hot-working, cold-working, forming, or machining, either separately or in some combination thereof, for example, a fastener such as a bolt. These nickel-base alloys that have been work-hardened or formed by the hot- or cold-working operations, such as rolling, drawing, spinning or severe bending, require softening before further processing can be continued. One of the thermal treatments that will produce this condition is known as stress equalizing heat treatment. In order to impart the required strength to the fastener or article, the article must then be heat-treated. In the stress equalizing heat treatment process, the article is heated to an elevated temperature, which is used to balance stresses in the cold-worked or hot-worked material without an appreciable decrease in the mechanical strength produced from the forming processes.

Nickel and nickel-base alloys may be subjected to one or more of five principal types of thermal treatment, depending upon chemical composition, fabrication requirements and intended service. One of these thermal treatment methods is "stress equalizing". Stress equalizing is a relatively low temperature heat treatment process that effects what is known as "partial recovery." This recovery, which precedes any detectable microscopic structural changes, consists of a considerable increase in the proportional limit, slight increases in hardness and tensile strength, no significant change in elongation or reduction of area, balancing of stresses, and return of electrical conductivity toward its characteristic value for the alloy in the annealed condition. The temperature required for stress equalizing depends upon the composition of the alloy. For cold drawn, nickel-base Monel 400 alloy rod material, the optimum temperature range is about 450° F. to about 600° F. A normal temperature of about 525° F. is recommended. Even though a long treatment period of up to 3 hours is recommended at this temperature, it has no detrimental effect on the base metal. According to the present invention, the treatment period is recommended between 1 hour to 1.5 hours in order to achieve substantially concurrent curing and cross-linking of the coating.

Collectively, all of the thermal processing steps leading to the strengthening of the material or article are generally termed "heat-treating" or "thermal-treating", wherein the article is subjected to one or more periods of exposure to an elevated temperature for a duration of time, with heating and cooling rates selected to aid in producing the article's desired final, metallurgical properties. The temperatures, times, and other parameters required to achieve particular properties are known to those skilled in the metallurgy field and are available in reference documents for standard corrosion-resistant stainless steel and superalloy materials.

A preferred, specific high-strength, corrosion-resistant nickel-base alloy material for fastener applications is the Monel 400 alloy (UNS N04400), which has a nominal composition of 66.0 percent nickel, 0.12 percent carbon, 0.90 percent manganese and 0.15 percent siliconc, 31.5 percent copper, and 1.35 percent iron plus minor impurities. Other contemplated heat-resistant nickel-base superalloys include, but are not limited to, Inconel 600, 625, 718, and X-750, Hastelloy X, Rene 41, Waspaloy, and Monel 400 and 500 series heat-treatable, nickel-base alloys.

The Monel 400 alloy is available commercially. After fabricating the alloy to the desired shape such as a fastener like those shown in FIGS. 4–6, the Monel 400 alloy is ready for coating and stress equalizing heat treatment. This state is usually obtained following fabrication including any of the processes of machining, forging, drawing, cold-working, or otherwise forming the fastener into the desired shape. During the fabrication, the article may be subjected to multiple forming operations and periodically re-annealed as needed, prior to the coating and stress equalizing heat-treatment process steps.

According to one embodiment of the present invention, a coating material is provided, preferably in solution so that it may be readily and evenly applied. The usual function of the coating material is to protect the base metal, to which it is applied from corrosion, including, for example, conventional electrolytic corrosion, galvanic corrosion, and stress corrosion. The coating material is a formulation that is primarily of an organic composition, but which may contain additives to improve the properties of the final coating. In one preferred embodiment, the coating is initially dissolved in a carrier liquid so that it can be applied to a substrate. After applying, the coating material is curable to effect structural changes within the organic component, typically cross-linking of the organic molecules, to improve the adhesion and cohesion of the coating. The coating layer 48, 148 on the preferred fastener is shown in FIGS. 4–6.

The use of such a curable coating is distinct from known non-curable coatings, such as a lacquer, which has different properties and is not suitable for the present, corrosion-protection application. Indeed, many non-curable lacquers will degrade upon exposure to elevated temperatures. Thus, the over-aging problems associated with the use of non-curable and even many curable coating materials, and which necessitate the present invention, simply do not arise. It is further understood that optional cleaning steps may be required to prepare the base metal for coating. Such cleaning procedures are those well known to those skilled in the coating field and include the use of solvents, acids, alkalines, and mechanical methods.

The present process contemplates the use of a number of curable organic coating materials. Preferred coating materials have a polyaromatic-based resin, such as, for example, phenolics, polyimides, polybenozazoles, or polytetrafluoroethylenes, and may be mixed with one or more plasticizers, and inorganic additives such as, for example, aluminum powder and/or strontium chromate. These coating materials are preferably dissolved in a suitable solvent present in an amount to produce a desired consistency based upon the desired end use.

For the phenolic-based coating material just discussed, the solvent preferably is a mixture of ethanol, toluene, and methyl ethyl ketone (MEK). A typical sprayable coating solution has about 30 percent by weight ethanol, about 7 percent by weight toluene, about 45 percent by weight methyl ethyl ketone as the solvent, about 2 percent by weight strontium chromate, and about 2 percent by weight aluminum powder, with the balance being phenolic resin and plasticizer. Optionally, a small amount of polytetrafluoroethylene may be added. Such a polyaromatic phenolic product is available commercially as "Hi-Kote® 1" from Hi-Shear Corporation, Torrance, Calif. The coating material has a standard elevated temperature curing treatment of 1 hour at 400° F.±25° F., as recommended by the manufacturer.

As shown by the various process methods outlined in FIGS. 1a–1c, the coating material is applied to the untreated fastener in coating step 18. Any suitable coating approach, such as dipping, spraying, brushing, or a fluidized bed method can be used. In one preferred approach, the solution of coating material dissolved in solvent is sprayed onto the untreated bolts. The solvent is removed from the as-applied coating by drying or "flash cure", either at room temperature or slightly elevated temperature, so that the coated article is dry to the touch. Preferably, a flash cure (exposure at approximately 200° F. for about two minutes) accomplishes evaporation of the solvent. The coated component is still not suitable for service at this point, because the coating is not sufficiently cured and adhered to the corrosion-resistant alloy or heat-resistant superalloy component and because the coating itself is not sufficiently coherent to resist corrosion or mechanical damage in service.

In the case of the preferred Hi-Kote® 1 coating, the as-sprayed coating was analyzed by EDS analysis in a scanning electron microscope. The heavier elements were present in the following amounts by weight: Al, 82.4 percent; Cr, 2.9 percent; Fe, 0.1 percent; Zn, 0.7 percent; and Sr, 13.9 percent. The lighter elements such as carbon and oxygen were detected in the coating but were not reported because the EDS analysis for such elements is not generally accurate.

As shown in FIG. 2, once coated, the base, nickel-alloy metal of the fastener and the applied coating are together heated to a suitable elevated temperature in a cure/stress equalizing step 20, to achieve the two results substantially concurrently. In this single step, the nickel-alloy material substrate is stress equalized heat-treated to its final, desired strength state, and the coating is aged to its desired final cured or bonded state.

According to the present invention, preferably, the temperature and time associated with the treatment of step 20 is selected to be that required to achieve the desired properties of the nickel-base alloy or stainless steel metal, as provided in the industry-accepted and proven process standards for that particular material. Surprisingly, stress-equalized heat-treatment is typically not that specified by the coating manufacturer and may not produce the most optimal cure state for the coating. However, contrary to expectations and manufacturer's specifications, the coating cured by the non-recommended procedures exhibits desirable adhesion to the alloy substrate. That is, according to the present invention, the curing of known coatings can sustain larger variations in time and temperature with acceptable results than can the heat-treatment tempering or hardening process of the alloy material.

In the case of the preferred Monel 400 nickel-base alloy and Hi-Kote® 1 coating discussed above, the preferred heat-treatment is the stress equalizing tempering treatment process of the Monel 400 nickel-base alloy, namely about 1½ hours at about 525° F. Thus, the cure/stress equalizing step 20 involves a significantly different temperature than is recommended by the manufacturer for the organic coating.

The final coating 48, shown schematically in FIGS. 4–6, is strongly adherent to ferrous and nickel-base alloy metal substrates and is also strongly coherent and cross-linked. In FIGS. 4–6, the thickness of the coatings 48 and 148 is exaggerated so that it is visible. In reality, the coating 48 (FIG. 4) is preferably from about 0.0003 inch to about 0.0005 inch thick after treating in step 26.

As mentioned above, the installation step reflects one of the advantages of the present invention. If the coating were not applied to the fastener, it would be necessary to either chrome plate and/or place a viscous wet-sealant material into the hole and onto the bolt prior to its installation, which in turn coats the contacting adjacent surfaces. The wet-sealant material is potentially toxic to workers, messy, requires constant refrigeration prior to use and is difficult to work with when applying, and necessitates the use of extensive clean-up tools as well as exposing surfaces of the pieces 42 and 44 to caustic chemical solutions after use in the installation of the fastener. Moreover, it has been observed that the presence of residual wet-sealant inhibits the adhesion of later-applied paint and other topcoats applied over the bolt heads.

The coating process of the present invention overcomes these and other problems confronted by the use of chrome plating and/or wet-sealants. According to the process of the present invention, wet-sealant is not needed or used during installation. Additionally, the later-applied paint or other topcoats adhere well over the pre-coated bolt heads. The following example serves only to further illustrate aspects of the present invention and should not be construed as limiting the invention.

EXAMPLE 1

Monel 400 Corrosion-resistant Alloy

The present invention also has been reduced to practice with one-piece rivets, and other fastener types, made of Monel 400 corrosion-resistant nickel-base alloy metal. Specifically, ⅛-inch, 3/16-inch and ¼-inch diameter Monel 400 rivets, initially in the untreated state, were anodized and spray-coated with a corrosion-inhibiting, phenolic-based coating, e.g., Hi-Kote® 1. The coated rivets were then thermally treated to achieve an ultimate shear strength of between about 49,000 psi and about 59,000 psi with the stress equalizing thermal treatment of approximately 1.5 hours at about 525° F. followed by an ambient, forced-air cooling period.

The coated rivets were mechanically tested in accordance with NASM5674 and NASM1312-20 and ASTM B 565 for driveability and shear testing, respectively, to verify that they met the required upset and ultimate shear strength requirements of the specifications. The ultimate shear strength range for standard, uncoated Monel 400 rivets is 49,000 psi to 59,000 psi. From the test results, the ultimate shear strength of the coated rivets ranged from 51,500 psi to 58,000 psi, depending upon the rivet diameter, well within the required allowable limits.

Rivets were also installed and subsequently removed to evaluate driveability and coating integrity characteristics using both macroscopic streoscope and scanning electron microscope (SEM) techniques. The driveability characteristics were acceptable without any indications of cracking or other material flaws. The coating itself exhibited no signs of cracking, spalling, or any other unacceptable conditions or abnormalities. The coatings were uniformly adherent and retained on the surface of the rivets even after the assemble process. Thus, the coating remained in place and tightly affixed to the rivets' surfaces to protect the components against corrosion after installation, obviating any need for the use of wet sealants.

EXAMPLE 2

A-286 Heat-resistant Superalloy

A comparative 2000-hour salt spray exposure test was performed on A-86 heat-resistant superalloy Hi-Set® one-piece fasteners having various surface preparation methods employed prior to the application of Hi-Kote® 1 aluminum-pigmented coating. Hi-Kote® 1 is a phenolic, resin-based aluminum-pigmented coating as described above, and has been demonstrated to possess excellent corrosion protection when subjected to 2000-hour salt spray corrosion evaluations, as well as high temperature resistance (to 400° F.), excellent resistance to fuel, hydraulic fluids, and various other aerospace and industrial solvents when applied on a wide variety of metallic substrates.

The salt spray evaluation testing was performed in accordance with ASTM B 117 apparatus and associated standard test method procedures. Aluminum-alloy test specimen assemblies, each containing six fastener installations, were placed at a 15° angle to the horizontal inside the salt spray test chamber for a period of 2000 hours.

All fasteners used in the evaluation were selected from the same manufacturing lot of Hi-Set® fasteners and represented standard manufacturing processes, which included the application of Hi-Kote® 1 coating onto A-286 heat-resistant superalloy material for the control specimens. Additional derivative test specimen samples were processed with modifications to the A-286 material preparation prior to the application of the Hi-Kote® 1 coating, which included various plating alternatives as well as wet-sealant installation of the standard production Hi-Set® fasteners. A separate test coupon assembly, specimen no. HS-2, containing a different type of production Hi-Kote® 1-coated titanium-alloy material fastener installations was selected for a known comparative baseline for corrosion protection results and characteristics.

Six (6) A-286 Hi-Set® fasteners were installed in test specimen assemblies having total thickness of 0.500 inch and comprised of two 0.250-inch thick components. One component was made from 2024-T351 Alclad aluminum-alloy and the other was made from 7075-T651 bare aluminum-alloy materials. The fasteners were installed in the test specimen assemblies using a Drivmatic® automated assembly machine that drilled, countersunk, and installed the Hi-Set® fasteners in one operation. The test specimen assembly components were chromic-acid anodized and sealed in accordance with the requirements and procedures of DPS-11.01-3 prior to drilling and countersinking the holes. The hole size that was drilled was 0.185 inch. The flush head fasteners were installed flush with the surface of the test specimen components within ±0.010 inch after installation. All fastener installations were spaced such that the center of the installed fastener heads were at least 1.000 inch away from the next adjacent fastener (i.e., center-to-center) with a 0.500-inch edge margin. For comparison, some of the fasteners were wet-sealant installed in accordance with DPS 4.50-36-17.

After installation of the fasteners, the test specimen assemblies were solvent cleaned with methyl ethyl ketone (MEK) to remove all grease, oils, wet-sealant residue, and fingerprints. The test specimen assemblies were placed at a 15° angle to the horizontal on a non-reactive plastic rack inside the salt spray chamber per ASTM B 117. The test chamber's environment as salt solution were monitored daily throughout the test for acceptable sodium chloride limits. The atmosphere was maintained satisfactorily while the pH of the salt solution was within the specification limits of 6.5 to 7.2 with a constant temperature of +95° F., +2° F./−3° F., per ASTM B 117 guidelines.

Salt spray (fog) testing was performed at the Hi-Shear Corporation's testing laboratory. The test specimen assemblies with fastener installations were exposed for 2000 hours to the salt spray environment in accordance with ASTM B 117. Observations were made at 24, 168, 300, 500, 700, 1000, 1500, and 2000 hours. All samples were visually examined and photographed throughout the 2000-hour salt spray exposure. The fastener heads, fastener upsets, and countersinks periphery surface areas on the aluminum-alloy test specimen components showed noticeable corrosion by-products except for the test specimen assembly containing the A286 HSR217AP6–9 fasteners (test specimen assembly number HS-5). These fasteners were prepared using a cadmium flash plate pre-treatment prior to being coated with the corrosion-inhibiting coating, Hi-Kote® 1. The current method of wet-sealant installing the Hi-Kote® 1 fasteners (test specimen assembly number HS-13) with DPS 2.50-17 Type 18 wet sealant applied prior to their installation showed more corrosion by-products around the fastener head, countersink, and upset than the HS-2 or HS-5 test specimen assemblies.

After the 2000-hour exposure, the leading candidates (test specimen assembly nos. HS-2, HS-5, and HS-13) selected due to minimal levels of corrosion activity were metallurgically sectioned and examined. All fasteners were removed from each of their respective test specimen assemblies in such a manner as to prevent deformation or other damage to the fasteners or the surfaces of the surrounding, adjacent holes. Loose corrosion and salt by-products were removed by de-ionized water and allowed to fully dry. Countersink areas and areas on the surfaces of the test specimen assembly components around the fastener heads were compared for appearance and condition. One fastener from each test specimen assembly was examined for corrosion or exfoliation attack by sectioning longitudinally while still installed in the aluminum-alloy test specimen components. Each individually mounted, metallurgical specimen contained one fastener from the previously mentioned test specimen assemblies along with both mating 2024 and 7075 aluminum-alloy components of the adjacent test specimen assembly. The specimens ere polished and then examined microscopically at 15× and 400× magnification in the un-etched condition. A Keller's reagent for the aluminum-alloy test specimen components was used to reveal the grain structure. This type of etchant does not aggressively attack the A286 or titanium alloy fastener materials. Alternate etchants could be used for the fastener material but may obscure the aluminum-alloy component's grain structure for proper evaluation.

Upon sectioning the 2024/7075 aluminum-alloy test specimen components with the fasteners still installed, the following was revealed. The wet-sealant installed HSR217AP6–9 Hi-Kote® 1 coated fastener installations in test specimen assembly number HS-13 revealed localized corrosion damage to a depth of 0.0412 inch along the grain boundary of the 7075 aluminum-alloy test specimen component starting adjacent to the fastener shank. The 2024-T351 Alclad aluminum-alloy component showed no signs of localized, intergranular corrosion activity. The test specimen assembly, no. HS-5, having fasteners with cadmium flash, Hi-Kote® 1 coated fasteners installed, revealed some localized corrosion activity in the fastener hole along the grain boundary in the same area as the HS-13 test specimen assembly, but with a reduced depth of only 0.0086 inch. The 2024-T351 Alclad aluminum-alloy component did not, as with the HS-13 test specimen baseline assembly, show any signs of localized intergranular corrosion activity. The HS-2 test specimen baseline assembly, which contained dry-installed coated titanium lockbolt fasteners, S4932868C06–08, as a control, did not display localized or intergranular corrosion in the 7075 aluminum-alloy component, but did display slight indications of corrosion pitting at the edge of the hole's countersink in the 2024-T351 Alclad aluminum-alloy test specimen component.

The test results indicated conclusively that the pre-coated A-286 heat-resistant superalloy HSR217 Hi-Set® fasteners, which employed the pre-treatment cadmium flash plate finish process prior to the application of the Hi-Kote® 1 coating, exhibited excellent corrosion protection performance. The pre-treatment process of applying the cadmium flash plate finish on the fasteners in lieu of stripping standard, full-up production cadmium plating prior to pre-coating with Hi-Kote® 1 revealed superior results when compared to wet-installed Hi-Set® fasteners pre-coated with Hi-Kote® 1 coating on standard prepared A-286 base material as well as the baseline production titanium-alloy fasteners pre-coated with Hi-Kote® 1.

In summary, the A-286 HSR217AP6–9 Hi-Set® fasteners processed with the pretreatment cadmium flash plate finish prior to being pre-coated out-performed the wet-installed, standard processed A-286 material Hi-Set® fasteners pre-coated with Hi-Kote® 1. The wet-sealant installation was performed in accordance with DPS 2.50-17, Type 18.

Furthermore, the Hi-Set® A-286 fasteners processed with the pre-treatment cadmium flash plate finish and subsequently pre-coated with Hi-Kote® 1 performed equivalently in protecting against exfoliation and pitting corrosion to that exhibited by the dry-installed, standard production titanium-alloy fasteners, which were pre-coated with Hi-Kote® 1.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for coating a high-strength, corrosion- and heat-resistant alloy aircraft structural component comprising the steps of:
   providing an aircraft structural component made from a high-strength, nickel-base alloy precursor, said nickel-base alloys having a pre-determined heat-treatment temperature;
   subjecting the component to a hardening treatment;
   providing a curable organic coating material comprising an organic, polyaromatic phenolic resin mixed with at least one plasticizer and an inorganic additive selected from the group consisting of aluminum powder, chromate fillers and mixtures thereof, said coating material having a non-volatile portion that is curable at about the pre-determined nickel-base steel alloy heat-treatment temperature;
   applying the coating material to the component; and
   curing the coated component in a stress equalizing heat-treatment step.

2. The method of claim 1, wherein the curing step tempers the coated, high-strength, alloy component to impart pre-determined metallurgical properties to the high-strength, stainless steel alloy material, and substantially concurrently cures the coating.

3. The method of claim 1, wherein the alloy precursor is a nickel-base alloy selected from the group consisting of Monel 400, Monel K-500, Inconel 600, and Inconel X-750.

4. The method of claim 1, wherein the alloy precursor is Monel 400.

5. The method of claim 1, wherein the coating material is dissolved in a solvent selected from the group consisting of ethanol, toluene, methyl ethyl ketone, and mixtures thereof.

6. The method of claim 5, wherein the coating material comprises a sprayable solution comprising about 30 weight percent ethanol, about 7 weight percent toluene, about 45 weight percent methyl ethyl ketone, about 2 weight percent aluminum powder and about 2 weight percent strontium chromate.

7. The method of claim 1, wherein the stress-equalizing heat-treatment step comprises tempering the nickel-base alloy precursor to a temperature of from about 450° F. to about 600° F. for a duration of from about 1 hour to about 1.5 hours.

8. The method of claim 1, wherein the coating is applied to the component to a thickness of from about 0.0003 inch to about 0.0005 inch.

9. The method of claim 1, further comprising the step of installing the coated component in an aircraft assembly.

10. The method of claim 9, wherein the coating is cured during the curing step from about 450° F. to about 600° F. for a duration of from about 1 hour to about 1.5 hours.

11. The method of claim 9, wherein the alloy precursor is selected from the group consisting of Monel 400, Monel K-500, Inconel 600, and Inconel X-750.

12. The method of claim 9, wherein the coating comprises polytetrafluoroethylene.

13. The method of claim 9, wherein the coating is dissolved in a solvent selected from the group consisting of ethanol, toluene, methyl ethyl ketone, and mixtures thereof.

14. The method of claim 13, wherein the coating comprises a sprayable solution comprising about 30 weight percent ethanol, about 7 weight percent toluene, about 45 weight percent methyl ethyl ketone, about 2 weight percent aluminum powder and about 2 weight percent strontium chromate.

15. The method of claim 9, wherein the coating is applied to the component to a thickness of from about 0.0003 inch to about 0.0005 inch.

* * * * *

UNITED STATES PATENT AND TRADEMARK OFFICE
CERTIFICATE OF CORRECTION

PATENT NO. : 6,953,509 B2  
DATED : October 11, 2005  
INVENTOR(S) : Keener

It is certified that error appears in the above-identified patent and that said Letters Patent is hereby corrected as shown below:

<u>Title page,</u>  
Item [75], Inventor, "Stephen G. Keener" should read -- Steven G. Keener --.

Signed and Sealed this

Third Day of January, 2006

JON W. DUDAS  
*Director of the United States Patent and Trademark Office*